United States Patent
Rohde et al.

(10) Patent No.: US 12,412,942 B2
(45) Date of Patent: Sep. 9, 2025

(54) BATTERY RECYCLING BY REDUCTION AND CARBONYLATION

(71) Applicant: BASF SE, Ludwigshafen am Rhein (DE)

(72) Inventors: Wolfgang Rohde, Ludwigshafen (DE); Torben Adermann, Ludwigshafen (DE); Kerstin Schierle-Arndt, Ludwigshafen (DE); Nuria Huguet Subiela, Ludwigshafen (DE); Andreas Kempter, Ludwigshafen (DE); Birgit Gerke, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 466 days.

(21) Appl. No.: 17/906,750

(22) PCT Filed: Mar. 23, 2021

(86) PCT No.: PCT/EP2021/057442
§ 371 (c)(1),
(2) Date: Sep. 20, 2022

(87) PCT Pub. No.: WO2021/191211
PCT Pub. Date: Sep. 30, 2021

(65) Prior Publication Data
US 2023/0155202 A1     May 18, 2023

(30) Foreign Application Priority Data

Mar. 23, 2020  (EP) .................... 20164834

(51) Int. Cl.
| C22B 23/06 | (2006.01) |
| C22B 1/00 | (2006.01) |
| C22B 5/12 | (2006.01) |
| C22B 23/02 | (2006.01) |
| H01M 10/54 | (2006.01) |

(52) U.S. Cl.
CPC ............ H01M 10/54 (2013.01); C22B 1/005 (2013.01); C22B 5/12 (2013.01); C22B 23/021 (2013.01); C22B 23/065 (2013.01)

(58) Field of Classification Search
None
See application file for complete search history.

(56) References Cited

U.S. PATENT DOCUMENTS

| 2008/0267810 A1 | 10/2008 | Curlook et al. |
| 2021/0269894 A1* | 9/2021 | Wang ..................... C01G 53/04 |
| 2023/0323507 A1* | 10/2023 | Breeze .................. C01G 53/10 |
| | | 423/145 |

FOREIGN PATENT DOCUMENTS

| CN | 104651620 A | * | 5/2015 |
| CN | 112151902 A | * | 12/2020 |
| JP | 2000143220 A | | 5/2000 |
| JP | 2006 219754 A | | 8/2006 |
| WO | WO 2019/197192 A1 | | 10/2019 |

OTHER PUBLICATIONS

English translation of CN 104651620 (originally published May 27, 2015), obtained from PE2E search.*
English translation of CN 112151902 (originally published Dec. 29, 2020), obtained from PE2E search.*
International Search Report dated Jun. 11, 2021, PCT/EP2021/057442.

* cited by examiner

*Primary Examiner* — George Wyszomierski
(74) *Attorney, Agent, or Firm* — Armstrong Teasdale LLP

(57) ABSTRACT

The present invention relates to a process for the recovery of transition metals from battery materials comprising (0.1) providing a battery material which comprises oxidic nickel and/or cobalt compounds, (1.1) heating the battery material above 350° C. to yield a reduced material which contains nickel and/or cobalt in elemental form, (2.1) carbonylating the reduced material with carbon monoxide optionally in the presence of a reactive gas to yield a solid carbonylation residue and a volatile carbonyl which comprises nickel and/or cobalt carbonyl containing compounds, and (3.1) separating the volatile carbonyl from the solid carbonylation residue by evaporation.

15 Claims, No Drawings

BATTERY RECYCLING BY REDUCTION AND CARBONYLATION

This application is a national stage filing under 35 U.S.C. § 371 of International Application No. PCT/EP2021/057442, filed on Mar. 23, 2021, and claims priority to EP Application Serial No. 20164834.2, filed Mar. 23, 2020; the disclosure of each of these applications are incorporated herein by reference in their entirety.

The present invention relates to a process for the recovery of transition metals from battery materials comprising (0.1) providing a battery material which comprises oxidic nickel and/or cobalt compounds, (1.1) heating the battery material above 350° C. to yield a reduced material which contains nickel and/or cobalt in elemental form, (2.1) carbonylating the reduced material with carbon monoxide optionally in the presence of a reactive gas to yield a solid carbonylation residue and a volatile carbonyl which comprises nickel and/or cobalt carbonyl containing compounds, and (3.1) separating the volatile carbonyl from the solid carbonylation residue by evaporation.

Lifetime of batteries, especially lithium ion batteries, is not unlimited. It is to be expected, therefore, that a growing number of spent batteries will emerge. Since they contain important transition metals such as, but not limited to cobalt and nickel, and, in addition, lithium, spent batteries may form a valuable source of raw materials for a new generation of batteries. For that reason, increased research work has been performed with the goal of recycling transition metals—and, optionally, even lithium—from used lithium ion batteries.

Various processes have been found to raw material recovery. One process is based upon smelting of the corresponding battery scrap followed by hydrometallurgical processing of the metallic alloy obtained from the smelting process. Another process is the direct hydrometallurgical processing of battery scrap materials. Such hydrometallurgical processes will furnish transition metals as aqueous solutions or in precipitated form, for example as hydroxides, separately or already in the desired stoichiometries for making a new cathode active material.

Various objects were pursued by the process of the present invention: An easy, cheap, fast and/or efficient recovery of the transition metals, such as nickel and/or cobalt. Avoid that new impurities are introduced into the process that would require an additional purification step The object was achieved by a process for the recovery of transition metals from battery materials comprising
- (0.1) providing a battery material which comprises oxidic nickel and/or cobalt compounds,
- (1.1) heating the battery material above 350° C. to yield a reduced material which contains nickel and/or cobalt in elemental form,
- (2.1) carbonylating the reduced material with carbon monoxide optionally in the presence of a reactive gas to yield a solid carbonylation residue and a volatile carbonyl which comprises nickel and/or cobalt carbonyl containing compounds, and
- (3.1) separating the volatile carbonyl from the solid carbonylation residue by evaporation.

In a preferred form the process for the recovery of transition metals from battery materials comprises
- (0.1) providing a battery material which comprises oxidic nickel and/or cobalt compounds, such as complete batteries, mechanically treated waste batteries or battery scraps,
- (0.2) optionally washing the battery material with an organic solvent to remove organic electrolyte and polymeric binder,
- (0.3) optionally washing the battery material with an aqueous medium,
- (0.4) optionally subjecting the battery material to a solid-solid separation, such as flotation, electro-sorting, sieving or magnetic separation, to remove solids, such as carbon, polymers, or magnetic material,
- (0.5) optionally heating the battery material up to 350° C. to evaporate organic components of the electrolyte,
- (1.1) heating the battery material above 350° C. to yield a reduced material which contains nickel and/or cobalt in elemental form,
- (1.2) optionally subjecting the reduced material to a dry solid-solid separation, such as electro-sorting, sieving or magnetic separation, to remove solids, such as carbon, polymers, or magnetic material,
- (1.3) optionally treating the reduced material with an aqueous medium which is optionally acidic to yield a slurry containing a dissolved lithium salt and an undissolved material, optionally subjecting the slurry to a solid-liquid separation to separate the dissolved lithium salt from the undissolved material, and optionally subjecting the undissolved material to a solid-solid separation to remove solids, such as carbon, polymers, or magnetic material, or undissolved lithium salts,
- (2.1) carbonylating the reduced material with carbon monoxide optionally in the presence of a reactive gas at a temperature of 30 to 300° C. and a partial pressure of 1 to 300 bar to yield a solid carbonylation residue and a volatile carbonyl selected from nickel and/or cobalt carbonyl containing compounds,
- (3.1) separating the volatile carbonyl from the solid carbonylation residue by evaporation,
- (3.2) optionally purifying the separated volatile carbonyl by adsorption, condensation, distillation, or vaporization,
- (3.3) optionally decomposing a solid non-volatile metal carbonyl in the solid carbonylation residue,
- (3.4) optionally subjecting the solid carbonylation residue to a dry solid-solid separation, such as electro-sorting, sieving or magnetic separation, to remove solids, such as carbon, polymers, or magnetic material,
- (3.5) optionally treating the solid carbonylation residue with an aqueous medium which is optionally acidic to yield a slurry containing a dissolved lithium salt and an undissolved material, optionally subjecting the slurry to a solid-liquid separation to separate the dissolved lithium salt from the undissolved material, optionally subjecting the undissolved material to a solid-solid separation to remove solids, such as carbon, polymers, magnetic material, or undissolved lithium salts,
- (4.1) optionally decomposing the volatile carbonyl to yield nickel and/or cobalt in elemental form or as salts, and
- (4.2.) optionally further purifying the nickel and/or cobalt.

In another preferred form the process comprises at least one of the steps (0.2), (0.3), (0.4), (0.5), (1.2), (1.3), (3.2), (3.3), (3.4), (3.5), and (4.2).

In another more preferred form the process comprises at least one of the steps (0.1), (1.1), (2.1), (3.1), (3.5), (4.1).

Recovery of transition metals from batteries, such as lithium ion batteries, usually means that the transition metals (e.g. nickel, cobalt and/or manganese) and optionally further valuable elements (e.g. lithium and/or carbon) can be at least partly recovered, typically at a recovery rate of each at least 10, 20, 30, 40, 50, 60, 70, 80, 90, 95 wt % or 99 w %. Preferably, at least nickel, cobalt and/or lithium is recovered by the process.

The transition metals and optionally further valuable elements are recovered from batteries, preferably lithium ion batteries, such as used or new batteries, parts of batteries, cathode-active-materials off-spec materials thereof (e.g. that do not meet the specifications and requirements), or production waste from battery production.

Step (0)—Providing and Preparing the Battery Material

Step (0.1) is providing a battery material which comprises oxidic nickel and/or cobalt compounds, such as complete batteries, mechanically treated waste batteries or battery scraps.

The battery material is a material that stems from batteries, preferably from lithium ion batteries. For safety reasons, such batteries are usually discharged completely, otherwise, shortcuts may occur that constitute fire and explosion hazards. Such lithium ion batteries may be disassembled, punched, milled, for example in a hammer mill, or shredded, for example in an industrial shredder. From this kind of mechanical processing the active material of the battery electrodes may be obtained containing a transition metal material which may have a regular shape, but usually it has irregular shape. It is preferred, though, to remove a light fraction such as housing parts made from organic plastics and aluminum foil or copper foil as far as possible, for example in a forced stream of gas, air separation or classification.

In one form the battery material is present in form of complete batteries.

The battery material is often from battery scraps of batteries, such as lithium ion batteries. Such battery scraps may stem from used batteries or from production waste, for example off-spec material. In a preferred form the transition metal material is obtained from mechanically treated battery scraps, for example from battery scraps treated in a hammer mill or in an industrial shredder. Such transition metal material may have an average particle diameter (D50) in the range of from 1 µm to 1 cm, preferably from 1 to 1000 µm, and in particular from 3 to 500 µm. Bigger parts of the battery scrap like the housings, the wiring and the electrode carrier films are usually separated mechanically such that the corresponding materials can be widely excluded from the transition metal material that is employed in the process.

Preferably, the battery material is present in form of complete batteries or mechanically treated battery scraps.

The battery material may contain lithium and its compounds, carbon in electrically conductive form (for example graphite, soot, and graphene), solvents used in electrolytes (for example organic carbonates such as diethyl carbonate), aluminum and compounds of aluminum (for example alumina), iron and iron compounds, zinc and zinc compounds, silicon and silicon compounds (for example silica, silicates and oxidized silicon $SiO_y$ with zero<y<2), tin, silicon-tin alloys, and organic polymers (such as polyethylene, polypropylene, and fluorinated polymers, for example polyvinylidene fluoride), fluoride, compounds of phosphorous (that may stem from liquid electrolytes, for example in the widely employed $LiPF_6$ and products stemming from the hydrolysis of $LiPF_6$).

The battery material may contain 1-61 wt %, preferably 2-30 wt %, and in particular 4-18 wt % oxidic nickel.

The battery material may contain 1-61 wt %, preferably 2-30 wt %, and in particular 4-20 wt % oxidic cobalt.

The battery material may contain 1-59 wt %, preferably 2-30 wt %, and in particular 4-20 wt % manganese, as metal or in form of one or more of its compounds The battery material may contain 0.5-12 wt %, preferably 1-8 wt %, and in particular 1-5 wt % lithium, as metal or in form of one or more of its compounds The battery material may contain 100 ppm to 15% by weight of aluminum, as metal or in form of one or more of its compounds.

The battery material may contain 20 ppm to 3% by weight of copper, as metal or in form of one or more of its compounds.

The battery material may contain 100 ppm to 5% by weight of iron, as metal or alloy or in form of one or more of its compounds. The transition metal material may contain 20 ppm to 2% by weight of zinc, as metal or alloy or in form of one or more of its compounds. The battery material may contain 20 ppm to 2% by weight of zirconium, as metal or alloy or in form of one or more of its compounds. The battery material may contain 20 ppm to 2% by weight of tungsten, as metal or alloy or in form of one or more of its compounds. The battery material may contain 0.5% to 10% by weight of fluorine, calculated as a sum of organic fluorine bound in organic polymers or additives and inorganic fluoride in one or more of its inorganic fluorides. The battery material may contain 0.2% to 10% by weight of phosphorus. Phosphorus may occur in one or more inorganic compounds.

The battery material usually contains cobalt and in most cases at least one of nickel and manganese. Examples of such transition metal materials may be based on $LiCoO_2$, on lithiated nickel cobalt manganese oxide ("NCM") or on lithiated nickel cobalt aluminum oxide ("NCA") or mixtures thereof.

Examples of layered nickel-cobalt-manganese oxides are compounds of the general formula $Li_{1+x}(Ni_aCo_bMn_cM^1_d)_{1-x}O_2$ with $M^1$ being selected from Mg, Ca, Ba, Al, Ti, Zr, Zn, Mo, V and Fe, the further variables being defined as follows: zero≤x≤0.2, zero≤a≤0.8, 0.05≤ b≤1, preferably 0.05<b≤0.5, zero≤c≤0.6, zero≤d≤0.1, and a+b+c+d=1. Preferred layered nickel-cobalt-manganese oxides are those where $M^1$ is selected from Ca, Mg, Zr, Al and Ba, and the further variables are defined as above. Preferred layered nickel-cobalt-manganese oxides are $Li_{(1+x)}[Ni_{0.33}Co_{0.33}Mn_{0.33}]_{(1-x)}O_2$, $Li_{(1+x)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.3}]_{(1-x)}O_2$, and $Li_{(1+x)}[Ni_{0.8}Co_{0.1}Mn_{0.1}]_{(1-x)}O_2$, each with x as defined above.

Examples of lithiated nickel-cobalt aluminum oxides are compounds of the general formula $Li[Ni_hCo_iAl_j]O_{2+r}$, where h is in the range of from 0.8 to 0.90, i is in the range of from 0.15 to 0.19, j is in the range of from 0.01 to 0.05, and r is in the range of from zero to 0.4.

Step (0.2) is optionally washing the battery material with an organic solvent to remove organic electrolyte or polymeric binder. Step (0.2) is preferably used when the battery material is present as mechanically treated battery scrap and may assist to dissolve and separate polymeric binders used to bind the transition metal oxides to current collector films, or, e.g., to bind graphite to current collector films. Suitable solvents are N-methylpyrrolidone, N,N-dimethyl-formamide, N,N-dimethylacetamide, N-ethylpyrrolidone, and dimethylsulfoxide, in pure form, as mixtures of at least two of the foregoing, or as a mixture with 1 to 99% by weight of water.

Step (0.3) is optionally washing the battery material with an aqueous medium. Step (0.3) is preferably used when the battery material is present as mechanically treated battery scrap and may assist to remove liquid impurities and water-soluble impurities from the battery material. Said washing step may be improved by a grinding for example in a ball mill or stirred ball mill. The washed battery material may be recovered by a solid-liquid separation step, for example a filtration or centrifugation or any kind of sedimentation and decantation. In order to support the recovery of finer particles of such solid transition metal material, flocculants may be added, for example polyacrylates.

Step (0.4) is optionally subjecting the battery material to a solid-solid separation, such as flotation, electrosorting, sieving or magnetic separation, to remove solids, such as carbon, polymers, or magnetic material or a combination of at least two of these operations. Step (0.4) is preferably used when the battery material is present as mechanically treated battery scrap and may assist to remove carbon and/or polymeric materials. Examples of solid-solid separation steps are classification, gravity concentration, flotation, dense media separation, magnetic separation and electrosorting. Usually an aqueous slurry obtained prior to step (0.4) may be subjected to the solid-solid separation except for the electrosorting which is done under dry conditions. The solid-solid separation step often serves to separate hydrophobic non-soluble components like carbon and polymers from the metal or metal oxide components.

The solid-solid separation step may be performed by mechanical, column or pneumatic or hybrid flotations. Collector compounds may be added to the slurry which render the hydrophobic components even more hydrophobic. Suitable collector compounds for carbon and polymeric materials are hydrocarbons or fatty alcohols which are introduced in amounts of 1 g/t to 50 kg/t of transition metal material.

It is also possible to perform the flotation in an inverse sense, i.e., transforming the originally hydrophilic components into strongly hydrophobic components by special collector substances, e.g., fatty alcohol sulfates or esterquats. Preferred is the direct flotation employing hydrocarbon collectors. In order to improve the selectivity of the flotation towards carbon and polymeric material particles suppressing agents can be added that reduce the amounts of entrained metallic and metal oxide components in the froth phase. Suppressing agents that can be used may be acids or bases for controlling the pH value in a range of from 3 to 9 or ionic components that may adsorb on more hydrophilic components. In order to increase the efficiency of the flotation it may be advantageous to add carrier particles that form agglomerates with the hydrophobic target particles under the flotation conditions.

Magnetic or magnetizable metal or metal oxide components may be separated by magnetic separation employing low, medium or high intensity magnetic separators depending on the susceptibility of the magnetizable components. It is possible as well to add magnetic carrier particles. Such magnetic carrier particles are able to form agglomerates with the target particles. By this also non-magnetic material can be removed by magnetic separation techniques. Preferably, magnetic carrier particles can be recycled within the separation process.

By the solid-solid separation steps typically at least two fractions of solid materials present as slurries will be obtained: One containing mainly the cobalt and nickel containing battery material and one containing mainly the carbonaceous and polymeric battery components. The first fraction may be then fed into step (1.1) while the second fraction may be further treated in order to recover the different constituents i.e. the carbonaceous and polymeric material.

Step (0.5) is optionally heating the battery material up to 350° C. to evaporate organic components of the electrolyte and decompose polymeric binder components. Step (0.5) is preferably used when the battery material is present as mechanically treated battery scrap and may assist to evaporate residual solvents from the battery electrolyte. This heat treatment is preferably done instead of optional steps (0.2) and (0.3).

Step (1)—Reducing the Battery Material and Work-Up

Step (1.1.) is heating the battery material above 350° C. to yield a reduced material which contains nickel and/or cobalt in elemental form.

The battery material which is heated in step (1.1) may be obtained from step (0.1), (0.2) (0.3), (0.4) or (0.5).

The battery material is usually heated to a temperature in the range of from 350 to 900° C., preferably 350 to 600° C., more preferably 350 to 500° C.

The heating may have a duration in the range of from 10 minutes to 30 hours, preferably 20 min to 8 hours, more preferably 30 min to 4 hours.

After having performed the heating the reduced material can be cooled down, for example to room temperature or somewhat above room temperature, for example 25 to 90° C.

Step (1.1.) may be performed in the presence of lime, quartz or silicate, where lime is preferred. Lime may be selected from slaked lime and quicklime or burnt lime. Usually 2 to 40% by weight of lime or quartz or silicate, referring to the battery material may be present.

Step (1.1) is preferably accomplished by heating the battery material in an inert, hydrogen, or oxygen atmosphere. More preferably, step (1.1) is accomplished by heating the battery material to a temperature of 350 to 900° C. in an inert, hydrogen, or oxygen atmosphere.

The hydrogen atmosphere may contain 0.1% to 100% by volume of hydrogen. Preferably it contains 3% to 100% by volume of hydrogen, the rest being a non-oxidizing gas, preferably nitrogen, argon, steam, carbon monoxide, carbon dioxide or mixtures of at least two of these gases. Preferred non-oxidizing gases are nitrogen and steam and mixtures of nitrogen and steam. The concentration of hydrogen in the reduction atmosphere and the reaction time are dependent on each other. Usually a low concentration of hydrogen requires longer reduction times and vice versa.

The hydrogen atmosphere is applied with a total pressure from 0.1 to 300 bar, preferably 1 to 100 bar and most preferred at ambient pressure of 1 bar or only slightly above up to 5 bar.

The heating may be performed in any kind of oven that allows the introduction of different gases. These ovens may be operated batch wise or continuously. Preferred ovens are rotary kilns and fluidized bed reactors. These reactors may be operated continuously. Different gas compositions may be applied in consecutive ovens or kilns or in consecutive sections of the kiln. In the latter case the gases are introduced in a way that no intermixing of reactive gases can occur.

The inert atmosphere may contain nitrogen or rare gas, preferably nitrogen. Oxidic nickel and/or cobalt may be reduced under inert atmosphere by carbon or organic material which usually stems from batteries or their decomposition products.

The oxygen atmosphere may contain some oxygen, for example 2 to 10% by volume. In one form the oxygen atmosphere is air. Oxidic nickel and/or cobalt may be reduced under oxygen atmosphere by carbon or organic material which usually stems from batteries and may form a reducing atmosphere by partial burning in the oxygen atmosphere.

In another form the composition of the atmosphere may change, for example in the case that volatile organic compounds are present in the feed that will be stripped off at an inert atmosphere before switching the atmosphere to an oxygen atmosphere.

In another form the atmosphere contains steam, for example under an inert atmosphere that contains water in the gas state or air that contains water in the gas state.

In one form the reduction conditions in step (1.1) are chosen that at least a part of the battery material contains para-, ferro- or ferrimagnetic components that can be separated by the application of a magnetic field, such as in step (1.2). Preferred is the formation of ferro- or ferrimagnetic components resulting from the at least partial reduction of the battery material.

Oxidic nickel and/or cobalt may be reduced in step (1.1) to nickel and/or cobalt in elemental form in an amount of at least 50, 60, 70, 80, 90 or 95 wt %.

The heating can be done in externally heated ovens e.g. electrically heated ovens and fluidized bed reactors or in ovens with internal burners like rotary kilns. The heat treatment can also be performed in vacuum ovens.

The heat treatment can be done in a wide pressure range from 0.001 bar to 100 bar. It is preferred to perform the heat treatment at a pressure slightly above 1 bar, at ambient pressure or below.

In one embodiment the heating can be performed in a smelting oven producing a metallic nickel and/or cobalt containing alloy and a slag material. Typically, the feed material is pelletized and is pre-mixed with slag forming additives and fluxes (e.g. soda, potash, lime, borax). Suitable smelter furnaces are bath smelting furnaces, top blown rotary converters, shaft furnaces, electric arc furnaces, plasma furnaces and others. The furnace can be operated in continuous or batch mode. The tapped alloy is typically fed to an underwater atomizer, granulator or casting mould (continuous or batch). The slag is typically fed to a slag cooling pool or to an underwater granulating device or is sprayed by a strong stream of gas to small droplets that are cooling down on their trajectory to the ground.

Step (1.2) is optionally subjecting the reduced material to a dry solid-solid separation, such as electro-sorting, sieving or magnetic separation, or eddy-current separation, to remove solids, such as carbon, polymers, magnetic material or non-ferrous metals.

Step (1.3) is
  optionally treating the reduced material with an aqueous medium which is optionally acidic to yield a slurry containing a dissolved lithium salt and an undissolved material,
  optionally subjecting the slurry to a solid-liquid separation to separate the dissolved lithium salt from the undissolved material, and
  optionally subjecting the undissolved material to a solid-solid separation to remove solids, such as carbon, polymers, magnetic material, or undissolved lithium salts.

The slurry usually contains dissolved lithium salts, such as LiOH, $LiHCO_3$ and/or $Li_2CO_3$ or the Li-salts of the acids employed.

The solid-liquid separation can be a filtration, centrifugation, sedimentation or decantation.

The aqueous medium should be able to selectively dissolve Li-components without dissolving the transition metals. This treatment can be performed at ambient temperature or higher temperatures for example in a range between 20 to 150° C. When employing temperatures above the boiling point of water the treatment is done at elevated pressures. Preferably the aqueous medium contains weak acid (e.g. carbonic acid, formic acid, acetic acid or sulfurous acid) or a strong acid (e.g. sulfuric acid, hydrochloric acid, nitric acid), where weak acids are preferred. These acids are usually employed in concentrations of 0.1 to 10 w % in water, preferably in concentrations of 1 to 10 w %. When employing carbonic acid, it is preferred to employ it under a pressure of carbon dioxide of 10 to 150 bar. In one form the aqueous medium is water, for example deionized water. In another form the reduced material is first treated with water and secondly treated with a diluted weak acid after a solid-liquid separation for example a filtration after the water treatment. Both extracts may be kept separate in order to separate the different Li-species dissolved. The treatment with the aqueous medium may have a duration in the range of from 20 minutes to 10 hours, preferably 1 to 8 hours. The ratio of the aqueous medium to the reduced material may be in the range of from 1:1 to 99:1, preferably 2:1 to 9:1 by weight.

Step (2)—Carbonylation of the Reduced Material

Step (2.1) is carbonylating the reduced material with carbon monoxide optionally in the presence of a reactive gas to yield a solid carbonylation residue and a volatile carbonyl which comprises nickel and/or cobalt carbonyl containing compounds.

The carbonylating may be achieved at a temperature of 30 to 300° C., preferably of 70 to 250° C.

The carbonylating may be achieved at a pressure of 1 to 300 bar, preferably of 50 to 300 bar.

Preferably, step (2.1) is carbonylating the reduced material with carbon monoxide at a temperature of 70 to 250° C. and a CO partial pressure of 50 to 300 bar.

The reduced material which is carbonylated may be obtained from step (1.1), (1.2) or (1.3).

The volatile carbonyl comprises usually $Ni(CO)_4$, $HCo(CO)_4$, and/or $(NO)Co(CO)_3$. Preferably, the volatile carbonyl comprises $Ni(CO)_4$, $HCo(CO)_4$ or a mixture of $Ni(CO)_4$, $HCo(CO)_4$.

In addition to the carbon monoxide an inert gas and/or a reactive gas may be present during carbonylating.

The inert gas may be nitrogen, argon or carbon dioxide. The inert gas may be present in up to 90 vol %.

In a preferred form where the reduced material contains mainly nickel and no or minor amounts of cobalt, the inert gas is present during carbonylation.

The reactive gas may be hydrogen or nitric oxide. The reactive gas may be present in up to 90 vol %. Preferably, the reactive gas is present when cobalt is present in the reduced material.

The reactive gas may be present when the reduced material contains minor amounts (e.g. up to 10, 5, or 1 wt %) or is free of nickel.

The carbonlyating may be made in two or more steps with varying conditions. In one form nickel and cobalt are present in the reduced material and the reduced material is first carbonylated in the absence of reactive gas to yield a volatile nickel carbonyl, and next in the presence of reactive gas to yield a volatile cobalt carbonyl. In another form nickel and cobalt are present in the reduced material and the reduced material is first carbonylated in the presence of reactive gas to yield a volatile cobalt carbonyl, and next in the absence of reactive gas to yield a volatile nickel carbonyl. Depending on the composition it can be beneficial to repeat this step several times.

A carbonylation catalyst (such as ammonia, sulfur, or sulfur compounds (e.g. hydrogen sulfide, carbon disulfide or sulfur dioxide)) may be present during carbonylating in the absence or in the presence of reactive gas.

In a preferred form where the reduced material contains mainly nickel (e.g. at least 50, 70, or 90 wt %) and preferably no or minor amounts of cobalt (e.g. less than 50, 20, or 10 wt %), the carbonylation catalyst may be present. The carbonylation catalyst can be added together with the carbon monoxide or the reduced material can be pre-treated with it.

Between both steps any non-volatile carbonyls formed in the solid carbonylation residue may be decomposed by heating and/or pressure release.

The reaction time of the carbonylation may be 1 h to 4 days, preferably 1 h to 2 days.

Step (3)—Separating and Purifying the Volatile Carbonyls

Step (3.1) is separating the volatile carbonyls from the solid carbonylation residue by evaporation.

The temperature during the separation should be kept below the decomposition temperature and above the boiling point of the volatile carbonyl. For example, nickel tetra carbonyl is stable up to temperatures of around 180° C. at ambient pressure, and cobalt tetracarbonyl hydride is stable at carbon monoxide partial pressures of 20 bar at 110° C. to 300 bar at 200° C.

The separation of the volatile carbonyl may take place during the carbonylation of step (2.1). The pressure and the gas composition in step (2.1) (e.g. the partial pressure of carbon monoxide, the inert gas or the hydrogen or nitrogen oxides) are preferably selected such that the separation can be performed at lowest possible temperature.

Step (3.2) is optionally purifying the separated volatile carbonyl by adsorption, condensation, distillation, or vaporization.

The volatile carbonyl can be condensed at temperatures below their respective boiling points which will depend on the pressure applied. From the condensed volatile carbonyl, the low boiling carbonyl compounds may be obtained in pure form by distillation or as separate pure compounds by fractionated distillation preferably under a carbon monoxide containing atmosphere.

The volatile carbonyl may also be adsorbed in organic solvents, water or aqueous media. The cobalt tetracarbonyl hydride may be absorbed in an aqueous media, such as alkaline hydroxide solutions.

Step (3.2) may assist to remove unwanted volatiles (e.g. iron carbonyls), or to isolate at least one of the volatile carbonyls, e.g. the nickel carbonyl or the cobalt carbonyl.

The solid carbonylation residue may be further processed, e.g. for the recovery of the remaining transition metals. Suitable processing steps for the solid carbonylation residue are steps (3.3), (3.4) and/or (3.5).

Step (3.3) is optionally decomposing a non-volatile metal carbonyl in the solid carbonylation residue. The decomposing can be achieved by heating the solid carbonylation residue and/or pressure release on the solid carbonylation residue.

Step (3.4) is optionally subjecting the solid carbonylation residue to a dry solid-solid separation, such as electrosorting, sieving or magnetic separation and eddy current separation, to remove solids, such as carbon, polymers, or magnetic material.

Step (3.5) is
  optionally treating the solid carbonylation residue with an aqueous medium which is optionally acidic to yield a slurry containing a dissolved lithium salt and an undissolved material,
  optionally subjecting the slurry to a solid-liquid separation to separate the dissolved lithium salt from the undissolved material, and
  optionally subjecting the undissolved material to a solid-solid separation to remove solids, such as carbon, polymers, magnetic material, or undissolved lithium salts.

Optional Step (4)—Decomposing the Volatile Carbonyl

Step (4.1) is optionally decomposing the volatile carbonyl to yield nickel and/or cobalt in elemental form or as salts.

The volatile carbonyl which is decomposed may be obtained from step (3.1) or (3.2).

The decomposing is usually accomplished by heating the volatile carbonyl to above 180° C., preferably at low carbon monoxide partial pressure. The decomposition of the volatile carbonyls can be accomplished as a mixture of nickel and cobalt carbonyls or after separation of both compounds.

The decomposing may also be accomplished by converting the volatile carbonyl to nickel and/or cobalt sulfates by reaction with $H_2SO_4$. This can be accomplished either by the dissolution of intermediately formed nickel and/or cobalt metal or oxides.

Step (4.2.) is optionally purifying the nickel and/or cobalt, e.g. by hydrometallurgical processes or by electrorefining. Preferably, the required metal purity is already achieved without step (4.2).

Other compounds may be recovered from the inventive process:

A lithium salt obtained as aqueous solution from steps (1.3) or (3.5) may be recovered by evaporating the water and crystallization of the lithium salt. It may be transformed into another lithium salt e.g. by precipitation or decomposition.

The solid carbonylation residue obtained from steps (2.1) may be fed to a smelter to recover mainly the copper and iron; or it may be subjected to a hydrometallurgical treatment from which the metals can be obtained as metal salt solutions which may be subjected to further separation and purification steps like precipitation, solvent extraction and/or electro winning and electro refining.

From the hydrometallurgical treatment carbonaceous solid materials (e.g. graphite) can be isolated, purified, and employed for the production of electrodes for electrochemical processes or batteries.

The invention offers various advantages: The present invention allows the recovery of valuable nickel and cobalt metals from batteries. It avoids hydrometallurgical steps which require high amount of acids and bases and frequent solid-liquid separation steps. The transformation of the nickel and cobalt constituents of the batteries into volatile carbonyls is highly selective, only iron carbonyls may be formed which can be separated easily by e.g. distillation. Especially copper impurities can be separated easily.

EXAMPLES

Description of Methods:

Elemental compositions are determined by elemental analysis using ICP-OES (inductively coupled plasma—optical emission spectroscopy) or ICP-MS (inductively coupled plasma—mass spectrometry). Phase analysis was done by powder x-ray diffraction (PXRD).

Abbreviations:

In the context of the present invention, normal pressure means 1 atm or 1013 mbar. "Normal conditions" mean normal pressure and 20° C. Nl stands for normal liter, liter at normal conditions (1 atm, 20° C.). Percentages refer to % by weight unless specifically defined otherwise. The expressions % by weight and wt % may be used interchangeably. Wherever mentioned, the terms "room temperature" and "ambient temperature" denote a temperature between about 18 and 25° C. XRD denotes powder x-ray investigation (radiation typically Cu k-alpha1 radiation of 154 pm or Mo k-alpha1 of 71 pm).

Example 1: Heating Synthetic Educt Sample

An amount of 200 g simulated spent battery scrap containing
- 78.8 g spent cathode active material containing nickel, cobalt and manganese in similar molar amounts, approximate formula $Li(Ni_{0.34}Co_{0.33}Mn_{0.33})O_2$,
- 62.2 g of carbon in the form of graphite and soot
- 47.0 g of organic electrolyte mixture (containing $LiPF_6$)
- 7.4 g polyvinylidene fluoride as binder,
- 2.4 g aluminum powder,
- 0.2 g iron powder,
- 2.0 g copper metal is placed into a 500-mL quartz round bottom flask and attached to a rotary evaporator in a way that the flask was immersed in an oven. Within 4.5 hours the rotating flask was heated to 800° C. in the course of 2 hours under a flow of argon (20 l/h) and held at this temperature for 1 hour under a flow of dry air (20 l/h) before cooling down to ambient temperature. An amount of 173.3 g heat treat material is obtained comprising a phase composition of Ni/Co-alloy, iron manganese oxide and graphite.

Example 1a: Heating Lithium Ion Batteries

An amount of ~1 t mechanically treated battery scrap containing spent cathode active material containing nickel, cobalt and manganese, organic carbon in the form of graphite and soot and residual electrolyte, and further impurities inter alia comprising fluorine compounds, phosphorous and calcium is treated to obtain a reduced mass according to the process described in Jia Li et al., Journal of Hazardous Materials 302 (2016) 97-104. The atmosphere within the roasting system is air whose oxygen reacts with the carbon in the battery scrap to form carbon monoxide, treatment temperature is 800° C.

After reaction and cool down to ambient temperature, the heat-treated material is recovered from the furnace, mechanically treated to obtain a particulate material and analyzed by means of X-ray powder diffraction and elemental analysis.

The Ni and Co content are determined to be 17.7 and 17.5 wt.-%, respectively, which act as reference for all further carbonylation examples (see below).

Comparing the XRD patterns before and after heat treatment with calculated reference patterns of $Li(Ni,Co,Mn)O_2$, Ni (which is identical with that one of $Co_xNi_{1-x}$, x=0-0.6) and Co, it can be concluded that the cathode active material is completely decomposed and Ni and Co are exclusively present as metallic phases, either as pure Ni or as an alloy in combination with Co. The presence of metallic nickel and cobalt is supported by the qualitative observation that the whole sample shows typical ferromagnetic behavior when it gets in touch with a permanent magnetic material.

Example 2: Carbonylating a Synthetic Educt Sample with CO and H2

1 g of a 50/50 mixture of Co and Ni powder is filled in an autoclave and reacted with CO and $H_2$ at 170° C. and 200 bar. The respective gas flow is 15 Nl/h for both CO and $H_2$. After 10 h reaction time the autoclave is purged with nitrogen and cooled down. The solid residue is isolated, weighed (0.5 g) and analyzed with regard to its Ni and Co content (Ni: 3 wt.-%, Co: 96 wt.-%) which relates to a Ni and Co recovery from the volatiles of 97 and 4%, respectively.

Example 2a: Carbonylating the Reduced Material with CO and H2 at 170° C./200 Bar 1 g of the above-mentioned reduced battery scrap material (obtained as shown in example 1a, Ni content 17.7%, Co content 17.5%) is filled an autoclave and reacted with CO and H2 at 170° C. and 200 bar. The respective gas flow is 15 N l/h for both CO and H2. After 10 h reaction time the autoclave is purged with nitrogen and cooled down. The solid residue was isolated, weighed (0.88 g) and analyzed with regard to its Ni and Co content (Ni: 15.4 wt.-%, Co: 16.1 wt.-%) which relates to a Ni and Co recovery from the volatiles of 23 and 19%, respectively.

Example 2b: Carbonylating the Reduced Material with CO and H2 at 200° C./200 Bar Example 2a is repeated applying 200° C. and 200 bar; all other experimental conditions are kept constant. 0.88 g of solid residue is isolated and analyzed with regard to its Ni and Co content (Ni: 16.5 wt.-%, Co: 17.2 wt.-%) which relates to a Ni and Co recovery of 18 and 14%, respectively.

Example 3: Carbonylating a Suspension of Ni Powder in Dodecane with CO 1 g Nickel powder is mixed with 70 mL dodecane, filled in a stirred autoclave and reacted with 15 Nl CO at 150° C. and 200 bar for 8 h; this procedures is done twice. After these two reactions, the autoclave is purged with nitrogen, cooled down and opened. It is observed that almost no Nickel powder can be found anymore, concluding that the carbonylation reaction and evaporation is successfully completed.

Example 3a: Carbonylating a Suspension of Co Powder in Dodecane with CO and H2

1 g Cobalt powder is mixed with 70 mL dodecane, filled in a stirred autoclave and reacted with 15 Nl CO and H2, respectively, at 170° C. and 200 bar for 8 h. In order to catch the volatile Co carbonyl species, the gas flow is led through a NaOH solution (10%). This solution is analyzed with regard to its Co content and used for quantifying the Co recovery to be 1%. After reaction, the autoclave is purged with nitrogen, cooled down and opened.

Example 3b: Carbonylating a Suspension of the Reduced Material in Dodecane with CO and H2

0.5 g of the above-mentioned reduced battery scrap material (obtained as shown in example 1a, Ni content 17.7%, Co content 17.5%) is mixed with 70 mL dodecane, filled in a stirred autoclave and reacted with CO and H2 applying different experimental conditions (see table 1). In order to catch the volatile Co carbonyl species, the gas flow is led through a NaOH solution (10%). This solution is analyzed with regard to its Co content and used for quantifying the Co recovery. The solution is not renewed between each experiment. The results are also summarized in table 1.

TABLE 1

| Exp. No | Temperature [° C.] | Pressure [bar] | Gas flow [Nl] CO | Gas flow [Nl] H2 | Duration [h] | Co conc. [ppm] | Volume of solution [mL] | Co recovery [%] |
|---|---|---|---|---|---|---|---|---|
| 1 | 110 | 100 | 15 | 0 | 4 | 0 | 160 | 0 |
| 2 | 110 | 200 | 15 | 15 | 4 | 8 | 160 | 1.5 |
| 3 | 130 | 100 | 15 | 0 | 4 | n.d. | 150 | |
| 4 | 130 | 200 | 15 | 15 | 3 | 80 | 150 | 13.7 |
| 5 | 80 | 50 | 15 | 0 | 3 | n.d. | 140 | |
| 6 | 170 | 200 | 15 | 15 | 3 | 210 | 118 | 28.3 |

The invention claimed is:

1. A process for recovering transition metals from a battery material comprising:
   (0.1) providing the battery material, wherein the battery material comprises oxidic nickel compounds, oxidic cobalt compounds, or combinations thereof,
   (1.1) heating the battery material above 350° C. to yield a reduced material comprising nickel in elemental form, cobalt in elemental form, or combinations thereof,
   (2.1) carbonylating the reduced material with carbon monoxide, optionally in the presence of a reactive gas, to yield a solid carbonylation residue and a volatile carbonyl, wherein the volatile carbonyl comprises nickel carbonyl containing compounds, cobalt carbonyl containing compounds, or combinations thereof, and
   (3.1) separating the volatile carbonyl from the solid carbonylation residue by evaporation.

2. The process according to claim 1, wherein the battery material is lithium ion battery materials.

3. The process according to claim 1, wherein the battery material comprises complete batteries, mechanically treated waste batteries or battery scraps, or scrap from the production of batteries or battery components.

4. The process according to claim 1, wherein the battery material comprises from 1 wt % to 30 wt %, oxidic nickel compounds.

5. The process according to claim 1, wherein the battery material comprises from 1 wt % to 30 wt %, oxidic cobalt compounds.

6. The process according to claim 1, wherein step (1.1) comprises heating the battery material in an inert, hydrogen, or oxygen atmosphere.

7. The process according to claim 1, wherein the carbonylating is achieved at a temperature ranging from 30° C. to 300° C. and a partial pressure ranging from 1 bar to 300 bar.

8. The process according to claim 1, wherein the volatile carbonyl comprises $Ni(CO)_4$, $HCo(CO)_4$, $(NO)Co(CO)_3$, or combinations thereof.

9. The process according to claim 1, wherein the carbonylating step further comprises carbonylating with a gas comprising an inert gas, a reactive gas, or a combination thereof.

10. The process according to claim 9, wherein the carbonylating step comprises carbonylating with the inert gas, and the inert gas is selected from the group consisting of nitrogen, argon, carbon dioxide, and combinations thereof.

11. The process according to claim 9, wherein the carbonylating step comprises carbonylating with the reactive gas, and the reactive gas is selected from the group consisting of hydrogen, nitric oxide, and combinations thereof.

12. The process according to claim 1, wherein during the carbonylating step, a carbonylation catalyst is present and the carbonylation catalyst is selected from ammonia, sulfur, and sulfur compounds.

13. The process according to claim 1, wherein nickel and cobalt are present in the reduced material and the reduced material is first carbonlyated in the absence of a reactive gas to yield a volatile nickel carbonyl, and next in the presence of reactive gas to yield a volatile cobalt carbonyl or vice versa.

14. The process according to claim 1, further comprising:
   (4.1) decomposing the volatile carbonyl to yield nickel in elemental form or as salts, cobalt in elemental form or as salts, or combinations thereof.

15. The process according to claim 1, wherein step (0.1) comprises at least one of the following steps:
   (0.2) optionally washing the battery material with an organic solvent to remove organic electrolyte and polymeric binder,
   (0.3) optionally washing the battery material with an aqueous medium,
   (0.4) optionally subjecting the battery material to a solid-solid separation to remove solids,
   (0.5) optionally heating the battery material up to 350° C. to evaporate organic components of the electrolyte;
   wherein step (1.1) comprises at least one of the following steps:
   (1.2) optionally subjecting the reduced material to a dry solid-solid separation to remove solids,
   (1.3) optionally treating the reduced material with an aqueous medium, which is optionally acidic, to yield a slurry comprising a dissolved lithium salt and an undissolved material, optionally further subjecting the slurry to a solid-liquid separation to separate the dissolved lithium salt from the undissolved material, and optionally further subjecting the undissolved material to a solid-solid separation to remove solids;
   wherein step (3.1) comprises at least one of the following steps:

(3.2) optionally purifying the separated volatile carbonyl by adsorption, condensation, distillation, or vaporization,
(3.3) optionally decomposing a non-volatile metal carbonyl in the solid carbonylation residue,
(3.4) optionally subjecting the solid carbonylation residue to a dry solid-solid separation to remove solids,
(3.5) optionally treating the solid carbonylation residue with an aqueous medium, which is optionally acidic, to yield a slurry comprising a dissolved lithium salt and an undissolved material, optionally further subjecting the slurry to a solid-liquid separation to separate the dissolved lithium salt from the undissolved material, and optionally further subjecting the undissolved material to a solid-solid separation to remove solids; and further comprising at least one of the following:

(4.1) optionally decomposing the volatile carbonyl to yield nickel in elemental form or as salts, cobalt in elemental form or as salts, or combinations thereof,
(4.2) optionally further purifying the nickel, cobalt, or combinations thereof.

* * * * *